(12) United States Patent
Namiki et al.

(10) Patent No.: US 11,260,765 B2
(45) Date of Patent: Mar. 1, 2022

(54) AUTONOMOUS TRAVEL WORK MACHINE AND CHARGING STATION

(71) Applicant: HONDA MOTOR CO., LTD., Tokyo (JP)

(72) Inventors: Takuma Namiki, Wako (JP); Kohei Matsuzawa, Wako (JP); Kenta Kawanishi, Wako (JP); Kotaro Nakamura, Wako (JP); Shuhei Maruyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 71 days.

(21) Appl. No.: 16/797,241

(22) Filed: Feb. 21, 2020

(65) Prior Publication Data

US 2020/0307397 A1    Oct. 1, 2020

(30) Foreign Application Priority Data

Mar. 28, 2019 (JP) .............................. JP2019-062742

(51) Int. Cl.
  *H02J 7/00* (2006.01)
  *B60L 53/16* (2019.01)
  *B60L 53/36* (2019.01)
  *G05D 1/02* (2020.01)

(52) U.S. Cl.
  CPC .............. *B60L 53/16* (2019.02); *B60L 53/36* (2019.02); *G05D 1/0225* (2013.01); *H02J 7/0045* (2013.01); *G05D 2201/0208* (2013.01)

(58) Field of Classification Search
  CPC ....... B60L 53/16; G05D 1/0225; H02J 7/0045
  USPC ........................................................ 320/109
  See application file for complete search history.

(56) References Cited

U.S. PATENT DOCUMENTS

| 2011/0148364 | A1* | 6/2011 | Ota | B25J 19/005 |
| | | | | 320/162 |
| 2017/0349055 | A1* | 12/2017 | Kilic | H01R 13/6315 |
| 2018/0001777 | A1* | 1/2018 | Kilic | B60L 53/37 |
| 2018/0188737 | A1 | 7/2018 | Won et al. | |
| 2019/0059680 | A1* | 2/2019 | Fox | A47L 11/4005 |
| 2019/0290089 | A1* | 9/2019 | Johnson | A47L 11/305 |
| 2019/0307059 | A1* | 10/2019 | Hong | A01D 34/81 |
| 2019/0307060 | A1* | 10/2019 | Hong | B25J 5/007 |
| 2020/0305342 | A1* | 10/2020 | Yoshimura | A01D 75/08 |
| 2021/0037706 | A1* | 2/2021 | Watanabe | A01D 34/78 |
| 2021/0072746 | A1* | 3/2021 | Mukaida | B63G 8/001 |
| 2021/0083494 | A1* | 3/2021 | Towner | A01D 34/008 |

FOREIGN PATENT DOCUMENTS

| CN | 108990508 A | 12/2018 |
| JP | 6285979 | 2/2018 |

OTHER PUBLICATIONS

European Search Report dated Jul. 22, 2020, 8 pages.

* cited by examiner

*Primary Examiner* — Suchin Parihar
(74) *Attorney, Agent, or Firm* — Rankin, Hill & Clark LLP (57) ABSTRACT

The lawn mower has at least a first structure in which a pair of power receiving terminals are separately disposed in the vehicle body cover and the vehicle body that are different parts from among a plurality of parts constituting the lawn mower, or a second structure in which the power receiving terminal, which is one of the pair of power receiving terminals, has a downward-facing contact surface that comes into contact with the charging station.

8 Claims, 9 Drawing Sheets

AUTONOMOUS TRAVEL WORK MACHINE AND CHARGING STATION

INCORPORATION BY REFERENCE

The present application claims priority under 35 U.S.C. § 119 to Japanese Patent Application No. 2019-062742 filed on Mar. 28, 2019. The content of the applications is incorporated herein by reference in its entirety.

BACKGROUND OF THE INVENTION

Field of the Invention

The present invention relates to an autonomous travel work machine and a charging station.

Description of the Related Art

An autonomous travel work machine is known, which can travel to a charging station by autonomous travel. As in Japanese Patent No. 6285979, there is a known configuration in which a terminal portion that protrudes rearward is provided in a charging station, and a recessed portion (a portion between a pair of power receiving terminals) into which the terminal portion of the charging station can be inserted is provided to a robot lawn mower which is a kind of autonomous travel work machine, and inserting the terminal portion to the recessed portion electrically connect the robot lawn mower to the charging station, and the battery in the robot lawn mower is charged with the power from the charging station (for example, Japanese Patent No. 6285979).

Incidentally, when lawn moistened with water or raindrops adheres to a robot lawn mower, electrical continuity may be established between a pair of power receiving terminals through moisture. If the robot lawn mower and the charging station are connected to each other in this state, the pair of terminals provided on the charging station side is energized, which may hinder proper charging. When the terminals on the charging station side are energized, the positive terminals may be corroded due to bimetallic corrosion.

Therefore, an object of the present invention is to make it possible to suppress the situation in which electrical continuity is established between a pair of power receiving terminals through moisture.

SUMMARY OF THE INVENTION

To achieve the aforementioned object, an autonomous travel work machine capable of traveling to a charging station by autonomous travel includes: a pair of power receiving terminals electrically connected to the charging station. The pair of power receiving terminals have at least a first structure in which the pair of power receiving terminals are separately disposed in different parts from among a plurality of parts constituting the autonomous travel work machine, or a second structure in which at least one of the pair of power receiving terminals has a downward-facing contact surface that comes into contact with the charging station.

In the aforementioned configuration, a vehicle body that has a traveling function, and a vehicle body cover that covers the vehicle body are included, and in the first structure, the pair of power receiving terminals are separately disposed in the vehicle body and the vehicle body cover.

Further, in the aforementioned configuration, a recessed portion into which a part of the charging station can enter is included, and at least one of the pair of power receiving terminals is provided in the recessed portion.

Further, in the aforementioned configuration, in the second structure, the power receiving terminal facing downward is provided in the recessed portion.

Further, in the aforementioned configuration, in the second structure, the other power receiving terminal has a laterally facing contact surface that comes into contact with the charging station.

Further, in the aforementioned configuration, in the second structure, the other power receiving terminal is provided below the one power receiving terminal and has an upward-facing contact surface that comes into contact with the charging station, and the part of the charging station is sandwiched between the pair of power receiving terminals from above and below.

Further, in the aforementioned configuration, in the second structure, the pair of power receiving terminals both have downward-facing contact surfaces that come into contact with the charging station, and a draining partition member is provided between the pair of power receiving terminals.

Further, in the aforementioned configuration, the pair of power receiving terminals are spaced apart along a direction in which a part of the charging station enters the recessed portion.

A charging station for the autonomous travel work machine includes: a pair of power transmission terminals electrically connected to the pair of power receiving terminals. One of the pair of power transmission terminals has a contact surface that comes into contact with the power receiving terminal, the contact surface facing upward and being an inclined surface that is inclined with respect to the horizontal plane.

Further, in the aforementioned configuration, a plug unit that has the pair of power transmission terminals spaced apart in the up-down direction and the horizontal direction is included, and the plug unit has an inclined surface in a region between the pair of power transmission terminals, the inclined surface draining water on the region out of the plug unit by utilizing at least gravity.

According to aspects of the present invention, a situation in which electrical continuity is established between a pair of power receiving terminals through moisture can be suppressed.

DETAILED DESCRIPTION OF THE PREFERRED EMBODIMENTS

Embodiments of the present invention will now be described with reference to the accompanying drawings.

First Embodiment

Figure 1:
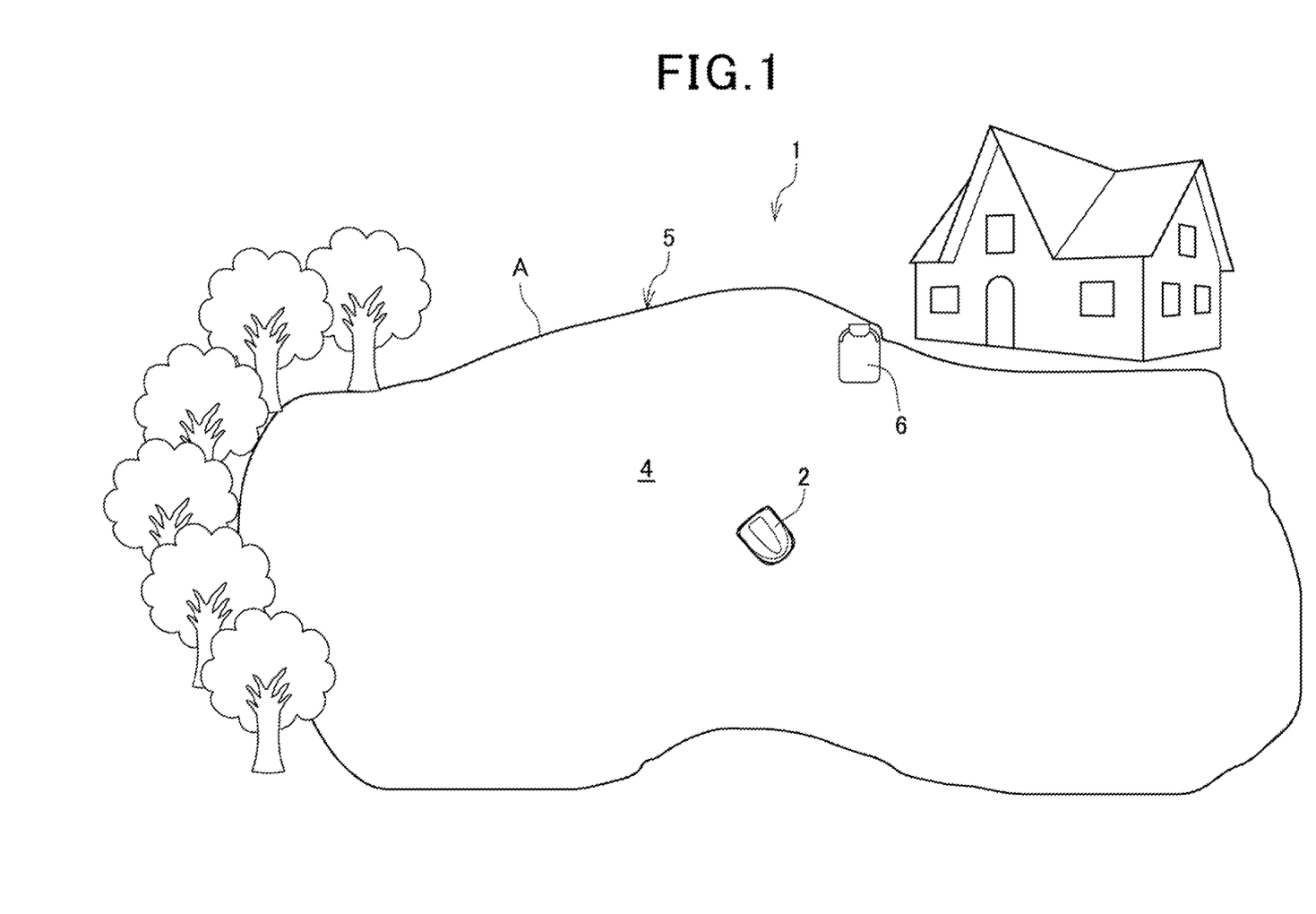
FIG. 1 is a diagram showing the configuration of an automated lawn mowing system according to the first embodiment.

FIG. 1 is a diagram showing the configuration of an automated lawn mowing system 1 according to the first embodiment.

The automated lawn mowing system 1 includes a robot lawn mower 2, an area wire 5 that defines a lawn mowing area 4 that is a work area, and a charging station 6.

The robot lawn mower 2 is an autonomous travel work machine that mows turf grass while automatically and autonomously running in the lawn mowing area 4 and is an example of an autonomous travel work machine or a self-propelled work machine. In the following description, the robot lawn mower 2 is referred to as "lawn mower 2".

The area wire 5 is installed so that the lawn mower 2 detects the boundary A of the lawn mowing area 4. The area wire 5 is laid along the boundary A and transmits a predetermined signal, and the lawn mower 2 detects the boundary A of the lawn mowing area 4 by detecting the signal from the area wire 5.

The charging station 6 is an apparatus that functions as a charging device for charging the lawn mower 2 as well as a standby place where the lawn mower 2 is put on standby when not working. The lawn mower 2 moves to the charging station 6 by autonomous travel, for example, at the end of the lawn mowing work, and is charged as appropriate with the electric power supplied from the charging station 6. Note that the area wire 5 transmits a predetermined signal based on the electric power or signal supplied from the charging station 6.

Figure 2:
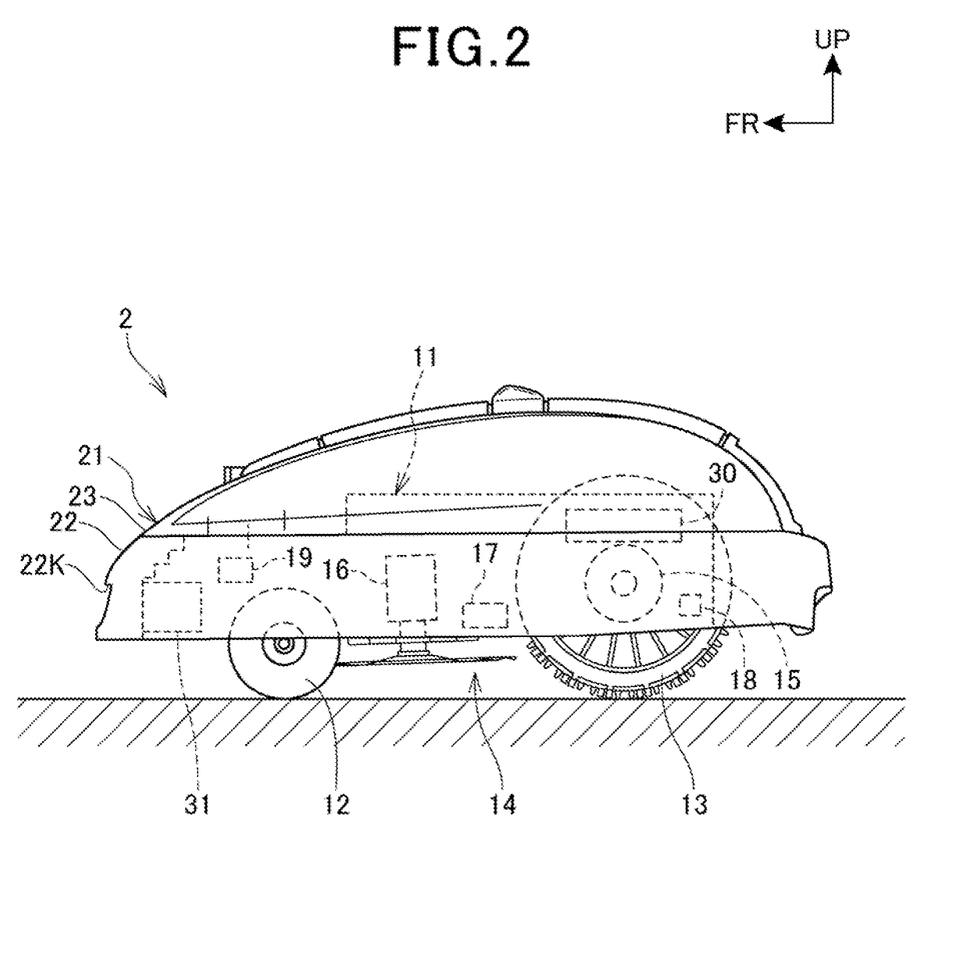
FIG. 2 is a diagram schematically showing the configuration of a lawn mower.

FIG. 2 is a diagram schematically showing the configuration of a lawn mower 2.

The lawn mower 2 includes a vehicle body 11 that has a traveling function and the like, and a vehicle body cover 21 that covers the vehicle body 11. Right and left front wheels 12 that can be steered to the right and left are provided at the front lower portion of the vehicle body 11, right and left rear wheels 13 that function as drive wheels are provided at the rear lower portion of the vehicle body 11, and a work unit 14 is provided at the central lower portion of the vehicle body 11. In addition, a terminal portion 31 that is electrically connected to the charging station 6 is provided at the front portion of the lawn mower 2. The details of the terminal portion 31 will be described later.

The vehicle body 11 is an electric unit that includes right and left traveling motors 15 that separately drive the right and left rear wheels 13, a work unit driving motor 16 that drives the work unit 14, a battery 17 that functions as a power source that supplies operation electric power to each component of the lawn mower 2, a wheel speed sensor 18 that detects the rotational speed of the right and left rear wheels 13 serving as drive wheels, a sensor unit 19 that detects the area wire 5 and the like, and a control unit 30 that controls each component of the lawn mower 2.

The control unit 30 has a CPU (Central Processing Unit) (not illustrated) and a memory (not illustrated) that stores programs and various data, and controls respective units of the lawn mower 2 by executing, by the CPU, the programs stored in the memory. The control unit 30 controls the travel of the lawn mower 2 by controlling the driving of the traveling motor 15 and performs a predetermined operation by controlling the driving of the work unit driving motor 16. The work unit 14 of this embodiment is a cutting blade disc with a cutting blade, and can perform lawn mowing work when the cutting blade disc is rotated.

The control unit 30 specifies the position of the lawn mower 2 based on the results of detection by the wheel speed sensor 18 and the sensor unit 19, and controls the travel of the lawn mower 2 based on the specified position. Hence, it can travel so that the lawn in the lawn mowing area 4 may be appropriately mowed, and can move to the charging station 6 after completion of the lawn mowing work.

The configuration of a well-known robot lawn mower can be widely applied to the configuration of the vehicle body 11 except the terminal portion 31. For example, technology using a position detection device, such as GPS or a gyro sensor, or image recognition technology using a camera, or other technology may be used as technology for specifying the lawn mowing area 4, the charging station 6, the current position, and the like.

The vehicle body cover 21 includes a main cover 22 that covers at least the front portion of the vehicle body 11, and a top cover 23 that is coupled to the main cover 22 from above. The main cover 22 is formed as a cover that covers the front, rear, left, and right sides of the vehicle body 11 and opens a part of the vehicle body 11 upward, and is made of a resin material. The top cover 23 is formed as a cover that covers a portion where a part of the vehicle body 11 in the main cover 22 is opened, and is made of a resin material. These covers 22 and 23 function as a protective cover for preventing rainwater and dust from adhering to the vehicle body 11 and a decorative cover for improving the appearance.

Note that the material for the body cover 21 is not limited to resin. In the case where the lawn mower 2 is compact, the main cover 22 and the top cover 23 may be integrally formed.

Figure 3:
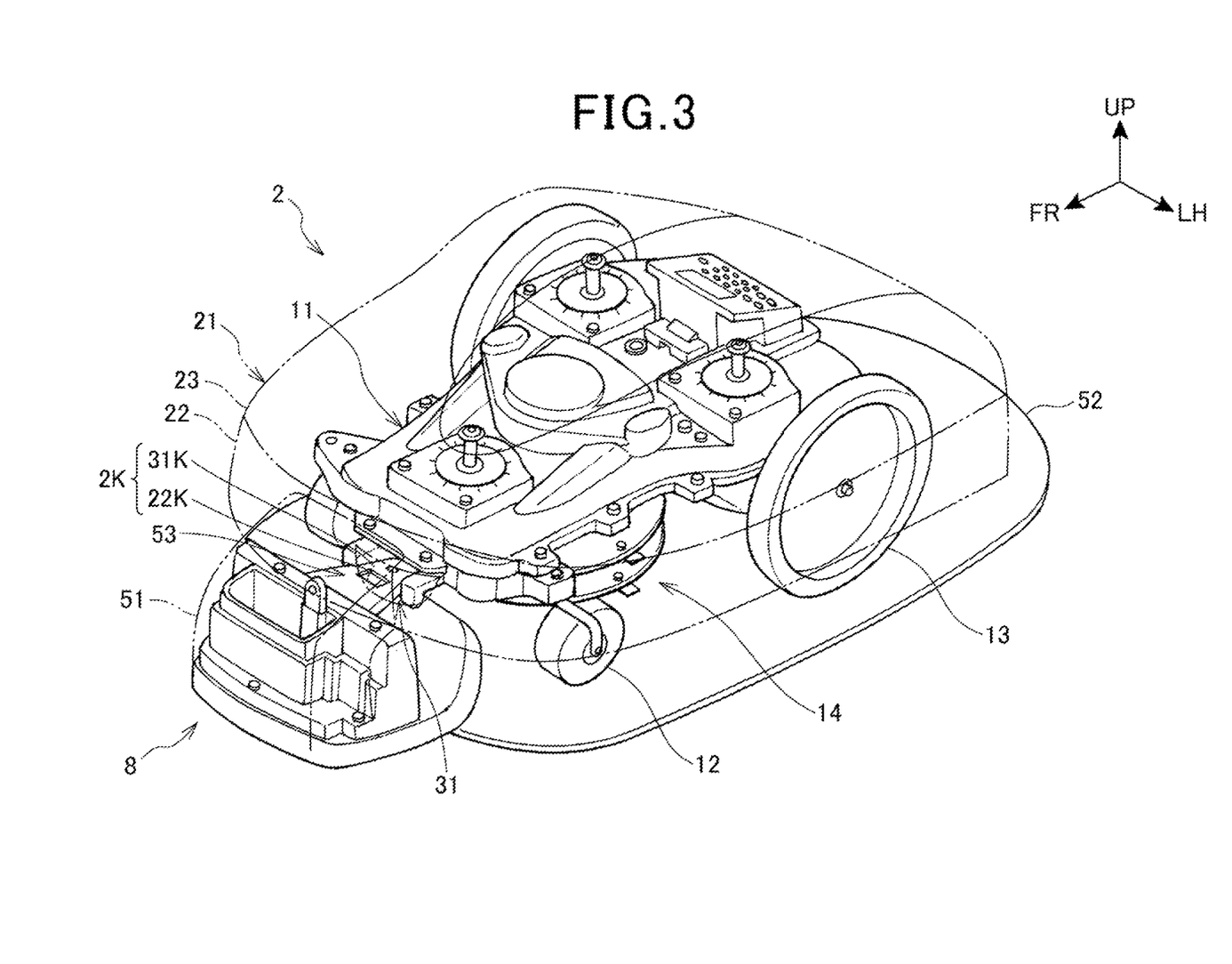
FIG. 3 is a diagram showing the state in which the lawn mower and a charging station are electrically connected to each other.

FIG. 3 is a diagram showing the state in which the lawn mower 2 and a charging station 6 are electrically connected to each other. For convenience of explanation, the vehicle body cover 21 is indicated by the two-dot chain line in FIG. 3.

As shown in FIG. 3, the charging station 6 includes a connection base 51 to which the lawn mower 2 is connected, and a mounting base 52 on which the lawn mower 2 connected to the connection base 51 is mounted. The connection base 51 has a plug unit 53 that protrudes toward the lawn mower 2 on the mounting base 52.

Figure 4:
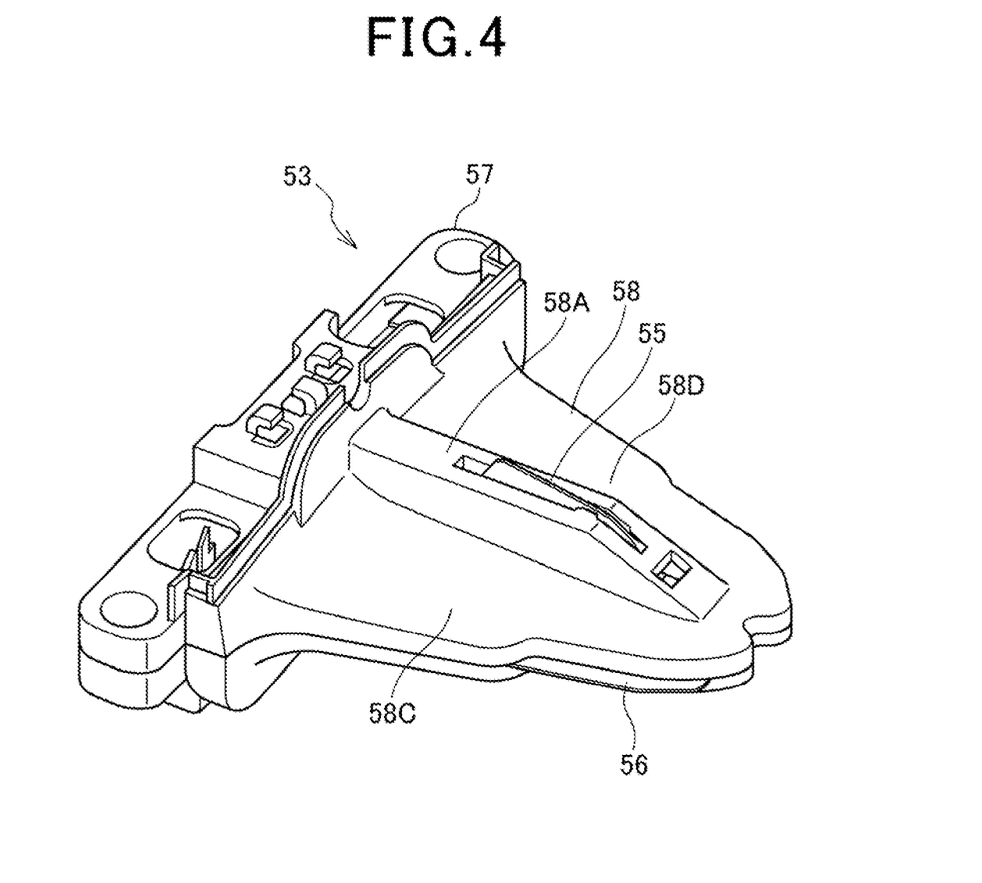
FIG. 4 is a perspective view of a plug unit.

Here, FIG. 4 is a perspective view of the plug unit 53. The plug unit 53 is formed in a triangular shape that narrows toward the rear in a top view, and includes a pair of power transmission terminals 55 and 56. Of the pair of power transmission terminals 55 and 56, the positive-side power transmission terminal 55 is formed as a terminal that protrudes upward from the center of the plug unit 53 when viewed along the right-left direction and the intermediate position of the plug unit 53 when viewed along the front-rear direction. The negative-side power transmission terminal 56 is a plate-like terminal that protrudes, when viewed along the right-left direction, outward from one of the right and left surfaces of the plug unit 53 (in this embodiment, the surface on the left side of the lawn mower 2) and the tip side of the plug unit 53.

To be specific, the plug unit 53 is integrally provided with a basal section 57 connected to the connection base 51 and a unit body 58 having a triangular shape in a top view and extending from the basal section 57. The unit body 58 has a raised portion 58A that rises upward from the central portion when viewed along the right-left direction and that extends in the front-rear direction, and the upper surface of the raised portion 58A is inclined obliquely downward from the basal section 57 toward the tip of the unit body 58. The positive-side power transmission terminal 55 is disposed in a region corresponding to the raised portion 58A, with a part thereof protruding upward. For this reason, even if moisture such as rainwater adheres to the raised portion 58A, moisture can gravitationally flow out of the raised portion 58A, and rainwater does not remain around the positive-side power transmission terminal 55.

Further, the raised portion 58A has an opening 58B that opens upward on the tip side of the positive-side power transmission terminal 55, and this opening 58B allows moisture flowing along the slope of the raised portion 58A to quickly drop downward.

Also in the upper surfaces 58C and 58D on the right and left sides of the raised portion 58A, the unit body 58 is inclined obliquely downward from the basal section 57 toward the tip of the unit body 58. For this reason, even if moisture such as rainwater adheres to the right and left upper surfaces 58C and 58D, it can quickly flow out of the unit body 58.

Since the negative-side power transmission terminal 56 is provided on the side surface of the unit body 58, even if moisture such as rainwater adheres thereto, it can quickly drop gravitationally.

Further, as shown in FIG. 4, the positive-side power transmission terminal 55 and the negative-side power transmission terminal 56 are spaced apart in the up-down direction, the front-rear direction, and the right-left direction. This facilitates avoidance of establishment of electrical continuity between the positive-side power transmission terminal 55 and the negative-side power transmission terminal 56 by moisture such as rainwater. Even if the grass that is attached to the lawn mower 2 and wetted with water adheres to the plug unit 53, the situation where establishment of electrical continuity between the positive-side power transmission terminal 55 and the negative-side power transmission terminal 56 by the wet grass is avoided easily.

Figure 5:
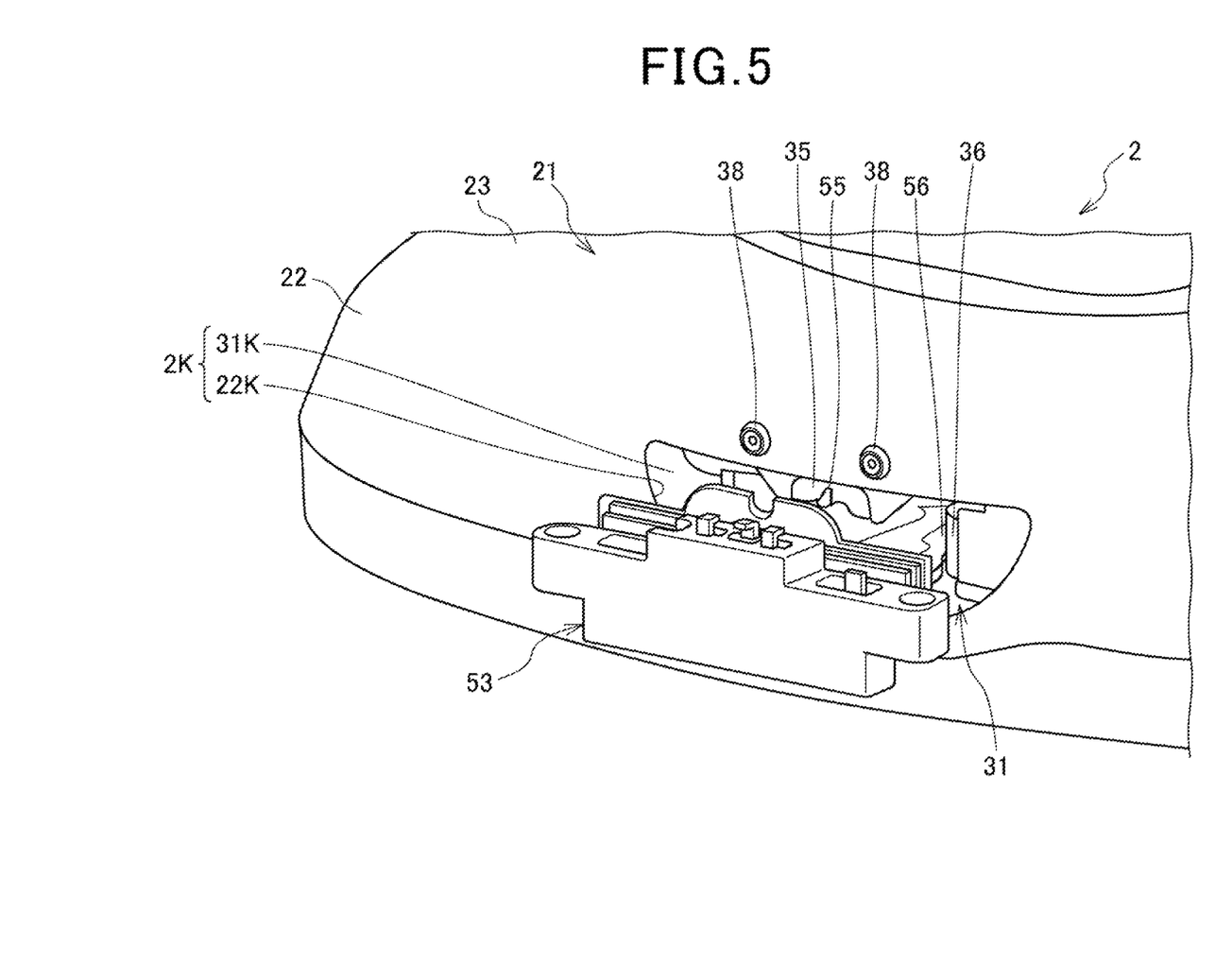
FIG. 5 is a diagram showing the plug unit in FIG. 3 together with a part of the lawn mower.

FIG. 5 is a diagram showing the plug unit 53 in FIG. 3 together with a part of the lawn mower 2. As shown in FIG. 5, an opening 22K that allows the plug unit 53 to be inserted toward the terminal portion 31 is provided in the front surface of the main cover 22 of the lawn mower 2. Further, a space 31K into which the plug unit 53 can be inserted is provided between the opening 22K and the terminal portion 31. The opening 22K and the space 31K define a recessed portion 2K that allows the plug unit 53, which is a part of the charging station 6, to be inserted into the terminal portion 31.

Figure 6:
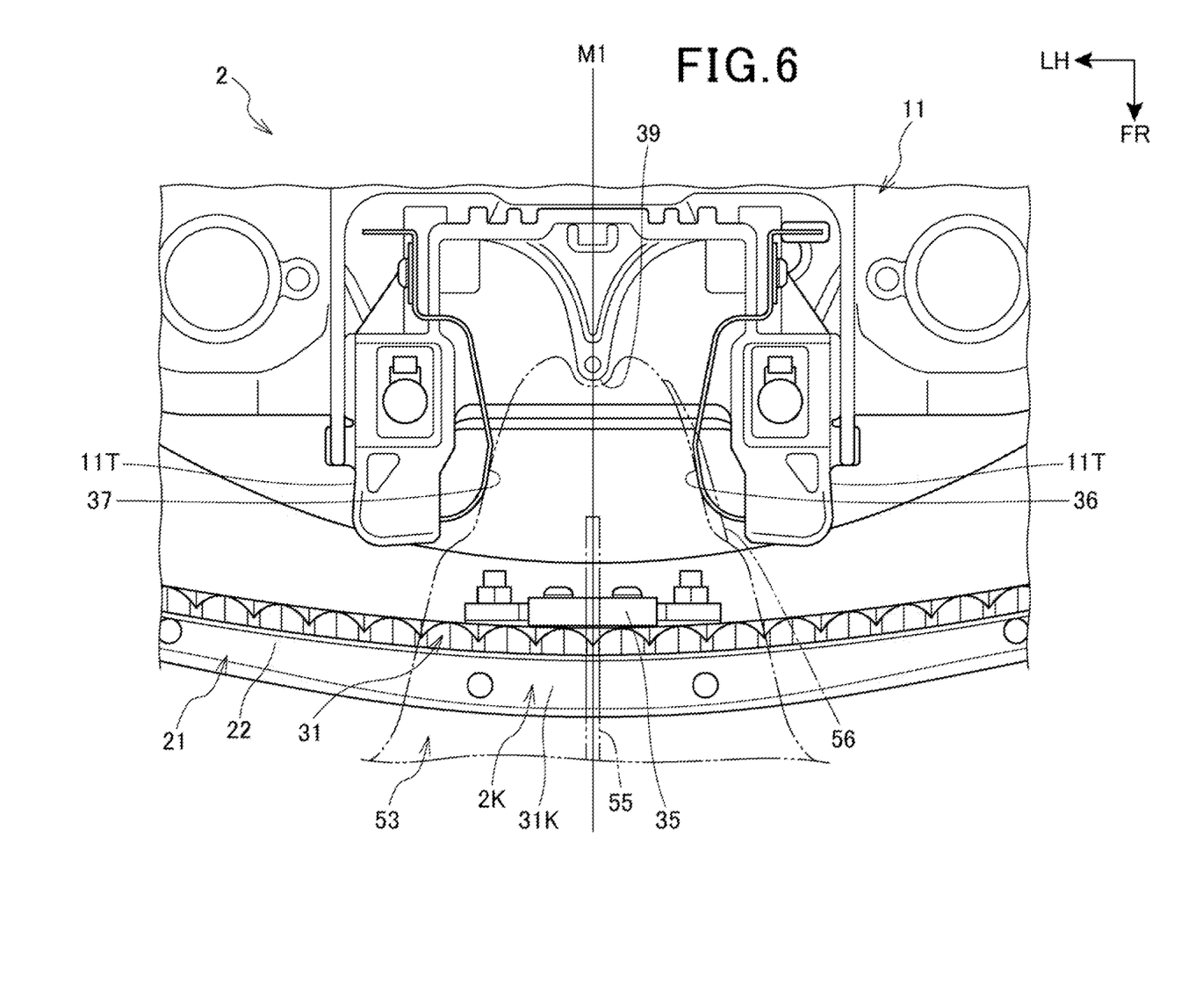
FIG. 6 is a diagram of a terminal portion viewed from the bottom of the lawn mower.
Figure 7:
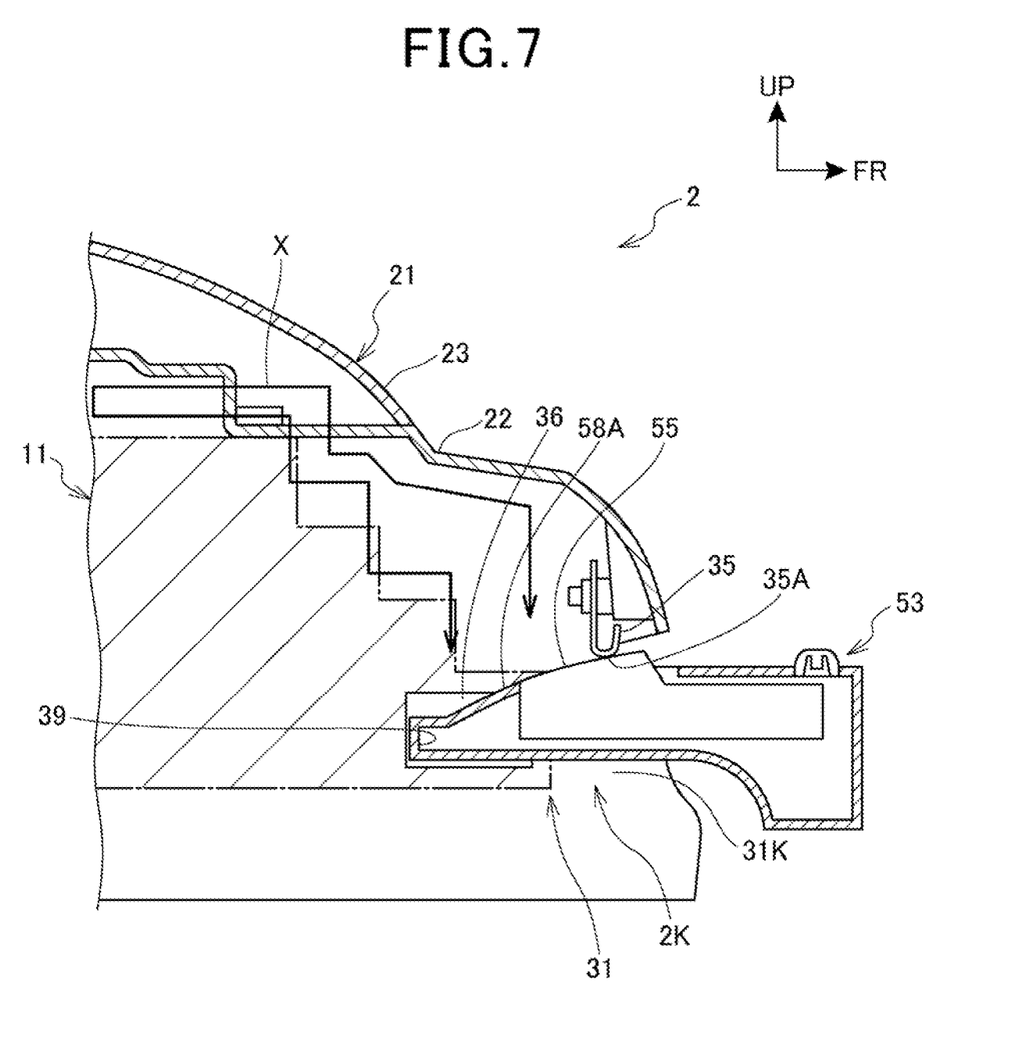
FIG. 7 is a diagram schematically showing a sectional side view along a line passing through the central position of the plug unit along the right-left direction in FIG. 3.

FIG. 6 is a diagram of a terminal portion 31 viewed from the bottom of the lawn mower 2. For convenience of explanation, in FIG. 6, the plug unit 53 inserted to the bottom of the recessed portion 2K is indicated by the two-dot chain line. FIG. 7 is a diagram schematically showing a sectional side view along a line passing through the central position of the plug unit 53 along the right-left direction in FIG. 3.

As shown in FIGS. 5 to 7, the terminal portion 31 has the positive-side power receiving terminal 35 provided on the vehicle body cover 21, the negative-side power receiving terminal 36 provided on the vehicle body 11, and a dummy terminal 37 opposed to the negative-side power receiving terminal 36.

The positive-side power receiving terminal 35 is attached to the foremost portion of the main cover 22 and is formed of a metal plate with a downward-facing contact surface 35A (see FIG. 7) which is in contact with the positive-side power transmission terminal 55 of the plug unit 53. To be specific, the positive-side power receiving terminal 35 is fixed to the rear surface of the foremost portion of the main cover 22 with a fastening member 38 (see FIG. 5) inserted from the front of the main cover 22, and protrudes downward from the foremost portion of the main cover 22 toward the recessed portion 2K. As shown in FIG. 7, the positive-side power receiving terminal 35 is formed so that it has a U-shaped cross section that opens upward and its lower surface is the contact surface 35A that comes in contact with the upper surface of the positive-side power transmission terminal 55 of the plug unit 53 inserted in the recessed portion 2K.

As shown in FIG. 7, the upper surface of the positive-side power transmission terminal 55 of the plug unit 53, that is, the contact surface comes in contact with the positive-side power receiving terminal 35 is inclined downward and toward the lawn mower 2 (the bottom of the recessed portion 2K). For this reason, even if moisture such as rainwater adheres to the upper surface of the positive-side power transmission terminal 55, moisture can quickly flow out of the terminal 55 gravitationally, which facilitates avoidance of the phenomenon in which rainwater remains on the upper surface of the positive-side power transmission terminal 55.

By the way, wet grass or raindrops may enter the recessed portion 2K of the lawn mower 2. In terms of this, in this configuration, the positive-side power receiving terminal 35 of the lawn mower 2 faces downward, so that wet grass or raindrops are unlikely to adhere thereto and, and even if it adheres thereto, it easily drops by gravity compared to the case where the positive-side power receiving terminal 35 faces upward.

Besides, the positive-side power transmission terminal 55 that comes in contact with the positive-side power receiving terminal 35 is an upward inclined surface that is inclined with respect to the horizontal plane, which facilitates avoidance of the remaining moisture as described above. Further, the terminals 35 and 55 rub against each other when the terminals 35 and 55 are electrically connected to each other, which effectively generates wiping action for removing foreign matters, such as moisture, from the terminals 35 and 55.

Further, as shown in FIGS. 6 and 7, the negative-side power receiving terminal 36 is spaced apart from the positive-side power receiving terminal 35 in the font-rear direction and the right-left direction. The negative-side power receiving terminal 36 is attached to a front projecting portion 11T (see FIG. 6) that constitutes a part of the foremost portion of the vehicle body 11, and is, in the bottom view shown in FIG. 6, a metal plate that curves in a U-shape from one of the right and left sides (in this embodiment, the right side in FIG. 6) to the other one of the right and left sides (the left side in FIG. 6). In other words, the negative-side power receiving terminal 36 is disposed in a position shifted to one of the right and left sides from the center plane M1 of the vehicle body 11 when viewed along the right and left direction (coinciding with the center plane of the lawn mower 2 when viewed along the right and left direction), and has a laterally (leftward in FIG. 6) facing contact surface that comes in contact with the negative-side power transmission terminal 56.

To be specific, the negative-side power receiving terminal 36 is provided in the position that overlaps with the negative-side power transmission terminal 56 of the plug unit 53 when the plug unit 53 is inserted to the position indicated by the two-dot chain line shown in FIG. 6. The negative-side power receiving terminal 36 curves in a U shape and deforms so that the pressure of contact with the negative-side power transmission terminal 56 does not become excessive, thereby keeping an appropriate state of contact between the terminals 36 and 53. Note that the negative-side power transmission terminal 56 side may be made deformable.

As shown in FIG. 6, the dummy terminal 37 facing the negative-side power receiving terminal 36 and the structure supporting the dummy terminal 37 are formed symmetrically to the negative-side power receiving terminal 36 and its peripheral structure, respectively. To be specific, the dummy terminal 37 and its support structure are formed in positions and structures that are symmetric with respect to the center plane M1 of the vehicle body 11 when viewed along the right-left direction. Since the plug unit 53 is inserted between the dummy terminal 37 and the negative-side power receiving terminal 36, it is easy to guide the travel direction of the lawn mower 2 toward the plug unit 53 to an appropriate direction or keep an appropriate state of the contact between the negative-side power receiving terminal 36 and the negative-side power transmission terminal 56.

In addition, the terminal portion 31 is provided with a contact portion 39 that the tip of the plug unit 53 comes in contact with. The contact portion 39 is provided in the position that the plug unit 53 comes in contact with when the pair of power receiving terminals 35 and 36 of the terminal portion 31 and the pair of power transmission terminals 55 and 56 of the plug unit 53 are electrically connected to each other.

In this configuration, the negative-side power receiving terminal 36 of the terminal portion 31 is provided on the relatively bottom side in the recessed portion 2K, so that wet grass or raindrops are unlikely to adhere to the negative-side power receiving terminal 36. Besides, the negative-side power receiving terminal 36 and the positive-side power receiving terminal 35 are separately disposed in the vehicle body cover 21 and the vehicle body 11, so that the continuity route (represented by X in FIG. 7) straddling between the vehicle body cover 21 and the vehicle body 11 can be made long, and the movement of moisture at the boundary between the vehicle body cover 21 and the vehicle body 11 can be suppressed easily.

Even if wet grass or moisture adheres to the negative-side power receiving terminal 36, since the negative-side power receiving terminal 36 and the negative-side power transmission terminal 56 rub against each other, wiping action for removing foreign matters such as moisture from the contact surfaces of the terminals 36 and 56 can be effectively generated. Even if wet grass or moisture remains on the negative-side power receiving terminal 36 nevertheless, since the positive-side power receiving terminal 35 is spaced apart along the front-rear direction from and is located at a different height from the negative-side power receiving terminal 36, the situation where electrical continuity is established between the pair of power receiving terminals 35 and 36 through wet grass or moisture can be effectively avoided.

Through these facts, the situation where electrical continuity is established between the pair of power receiving terminals 35 and 36 through moisture can be effectively suppressed, and the situation where electrical continuity is established between the pair of power transmission terminals 55 and 56 and proper charging is not achieved, and the bimetallic corrosion can be effectively suppressed.

As described above, the lawn mower 2 of this embodiment has a first structure in which the pair of power receiving terminals 35 and 36 are separately disposed in the vehicle body cover 21 and the vehicle body 11 which are different parts from among the plurality of parts constituting the lawn mower 2. With this first structure, the continuity route X (see FIG. 7) can be made long, the movement of moisture at the boundary between parts can be easily canceled, and the situation where electrical continuity is established between the pair of power receiving terminals 35 and 36 through moisture can be suppressed. Accordingly, the situation where electrical continuity is established between the pair of power transmission terminals 55 and 56 and proper charging is not achieved, and the bimetallic corrosion can be effectively suppressed.

Note that the pair of power receiving terminals 35 and 36 are not necessarily separately disposed in the vehicle body cover 21 and the vehicle body 11, and may be separately disposed in a plurality of other different parts constituting the lawn mower 2.

The lawn mower 2 also has a second structure in which the power receiving terminal 35, which is one of the pair of power receiving terminals 35 and 36, has the contact surface 35A (see FIG. 7) which comes in contact with the charging station 6 and faces downward. With this second structure, moisture and the like is unlikely to remain in the power receiving terminal 35 facing downward, which also suppresses the situation where electrical continuity is established between the pair of power receiving terminals 35 and 36 and further suppresses the situation where proper charging is not achieved.

Note that, instead of the power receiving terminal 35 or in addition to the power receiving terminal 35, the other one, that is, the power receiving terminal 36 may have a downward-facing contact surface that comes in contact with the charging station 6. In short, when at least one of the pair of power receiving terminals 35 and 36 has a downward-facing contact surface that comes in contact with the charging station 6, the situation where electrical continuity is established between the pair of power receiving terminals 35 and 36 through moisture can be further suppressed.

Further, the lawn mower 2 has a recessed portion 2K into which the plug unit 53 that is a part of the charging station 6 can enter, and the pair of power receiving terminals 35 and 36 are both located in the recessed portion 2K, which also makes it difficult for moisture such as rainwater to adhere to the power receiving terminals 35 and 36, and the situation where electrical continuity is established between the power receiving terminals 35 and 36 through moisture can be suppressed. Even if only one of the power receiving terminals 35 and 36 is located in the recessed portion 2K, the situation where electrical continuity is established between the power receiving terminals 35 and 36 through moisture can be suppressed.

In addition, since the power receiving terminal 35 facing downward in the second structure is provided in the recessed portion 2K, moisture is more unlikely to adhere to the power receiving terminal 35. Besides, since the other terminal, that is, the power receiving terminal 36 in the second structure has a laterally facing contact surface that comes in contact with the charging station 6, it is also difficult for moisture to adhere to or remain on the other terminal, that is, the power receiving terminal 36.

Furthermore, since one of the pair of power transmission terminals 55 and 56 provided in the charging station 6 has a contact surface that comes into contact with the power receiving terminal 36 so that the contact surface faces upward and is inclined with respect to the horizontal plane, even moisture or the like on the contact surface can be discharged quickly. The wiping action between the terminals 55 and 35 and between the terminals 56 and 36 can also effectively suppress the situation where moisture or the like remains.

The charging station 6 further includes a plug unit 53 provided with a pair of power transmission terminals 55 and 56 spaced apart in the up-down direction, the horizontal direction, and the height direction. The plug unit 53 has an inclined surface in a region between the pair of power transmission terminals 55 and 56, and the inclined surface drains the moisture on the region out of the plug unit 53 by utilizing at least gravity. Hence, it is possible to suppress the situation where moisture or the like remains on the power transmission terminals 55 and 56 and their periphery.

Second Embodiment

Figure 8:
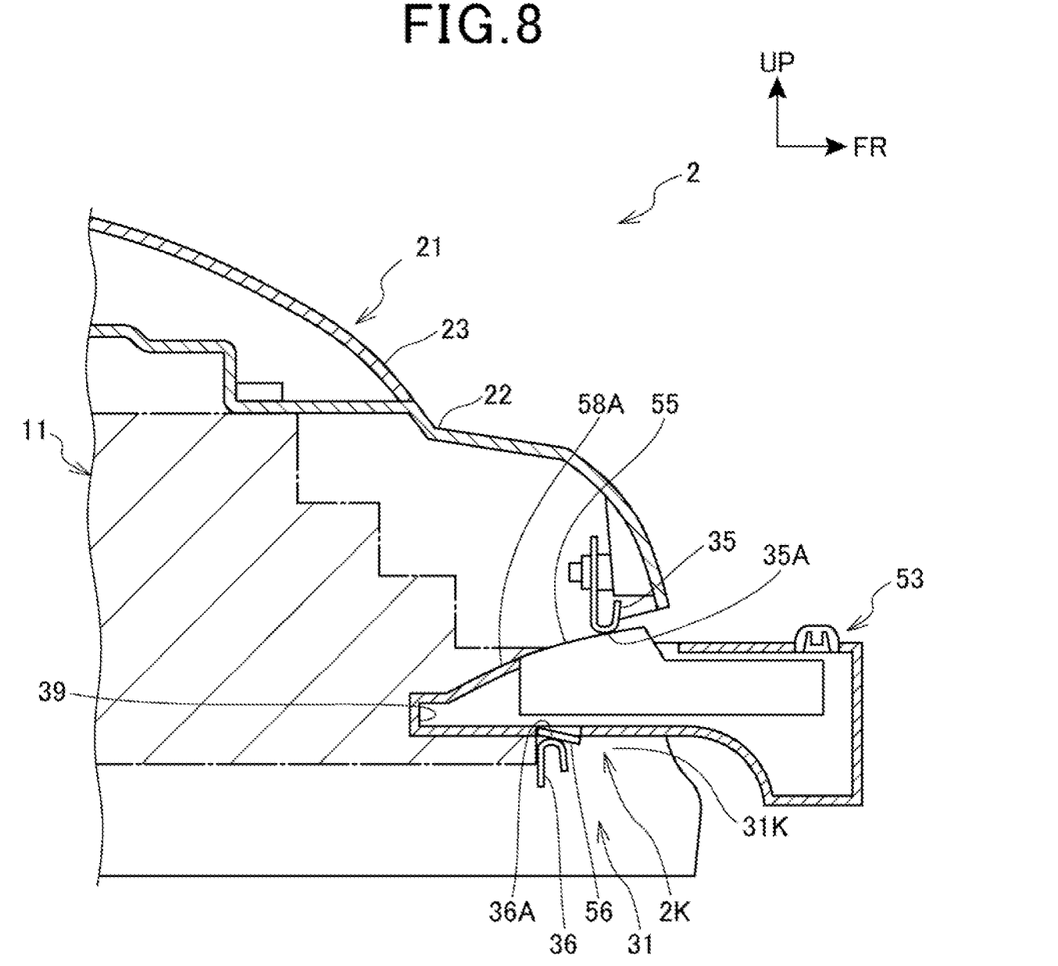
FIG. 8 is a diagram schematically showing a sectional side view in the state in which the lawn mower and the plug unit in the automated lawn mowing system of the second embodiment are connected to each other.

FIG. 8 is a diagram schematically showing a sectional side view in the state in which the lawn mower 2 and the plug unit 53 in the automated lawn mowing system 1 of the second embodiment are connected to each other.

In the second embodiment, the power receiving terminal 36 of the lawn mower 2 and the power transmission terminal 56 of the charging station 6 are different from those in the first embodiment. Hereinafter, the description overlapping with the first embodiment will be omitted, and differences will be explained.

The power receiving terminal 36 of the lawn mower 2 is provided in a position shifted downward and rearward from the power receiving terminal 35 facing downward. The power receiving terminal 36 is formed so that it has a U-shaped cross section that opens downward and its upper surface is the contact surface 36A that comes into contact with the lower surface of the positive-side power transmission terminal 56 of the plug unit 53 inserted in the recessed portion 2K.

The power transmission terminal 56 of the charging station 6 is provided on the lower surface of the plug unit 53. The power transmission terminal 56 projects downward from the lower surface of the plug unit 53, and the lower surface is an inclined surface inclined obliquely upward and toward the lawn mower 2.

In the second embodiment, the power receiving terminal 36 of the lawn mower 2 is provided below the power receiving terminal 35 facing downward, and the contact surface 36A that comes into electrical contact with the charging station 6 faces upward, and the plug unit 53 constituting a part of the charging station 6 is sandwiched between the pair of power receiving terminals 35 and 36 from above and below.

With this configuration, the plug unit 53 enters between the upper and lower terminals 35 and 55 and between the terminals 55 and 56, so that electrical continuity is easily established between the upper and lower terminals (between the power receiving terminals 35 and 36 and between the power transmission terminals 55 and 56) through moisture. Moreover, it is easy to use parts of one power receiving terminal 35 also in the other power receiving terminal 36.

Further, moisture or the like is unlikely to adhere to the power receiving terminal 36 facing upward because it is disposed near the bottom of the recessed portion 2K. Since the power transmission terminal 56 that comes into contact with the power receiving terminal 36 faces downward, moisture or the like is less likely to adhere to the power transmission terminal 56. This effectively suppresses the situation where electrical continuity is established between the pair of power transmission terminals 55 and 56 through moisture and proper charging is not achieved, and the bimetallic corrosion.

Third Embodiment

Figure 9:
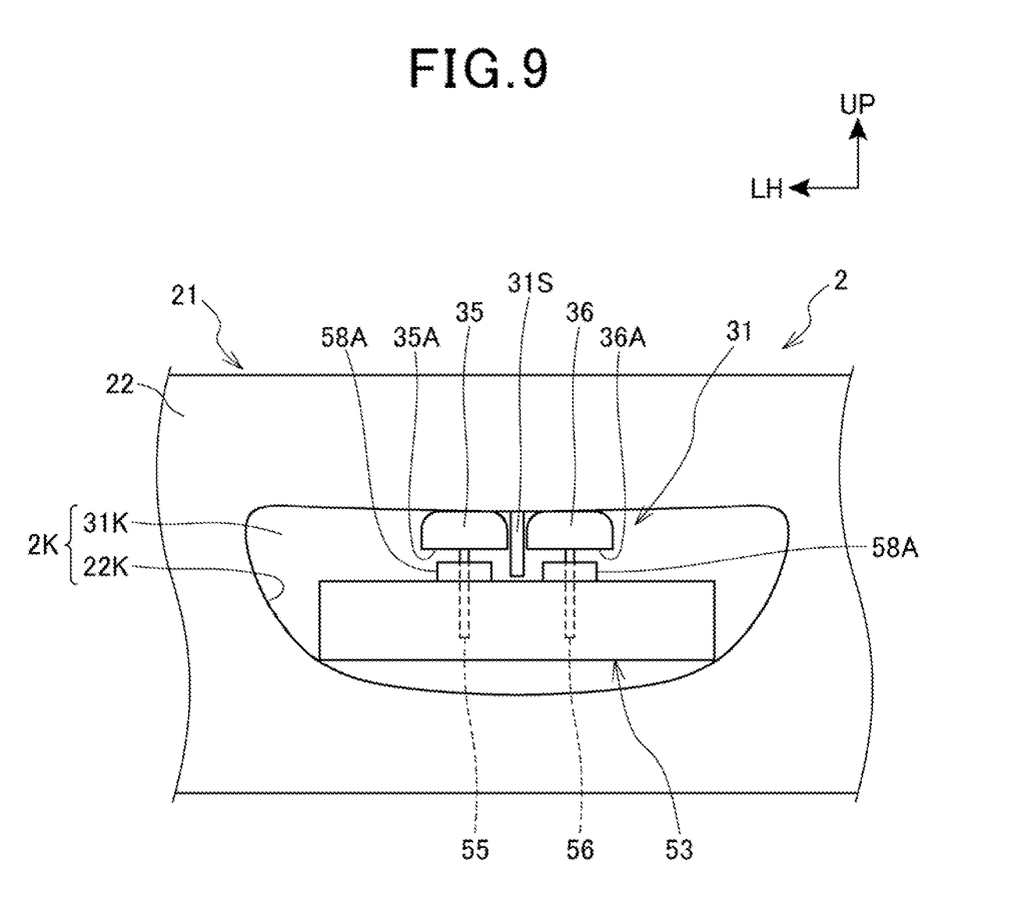
FIG. 9 is a diagram schematically showing an opening of the lawn mower in the automated lawn mowing system of the third embodiment, together with the peripheral configuration.

FIG. 9 is a diagram schematically showing an opening 22K of the lawn mower 2 in the automated lawn mowing system 1 of the third embodiment, together with the peripheral configuration.

The third embodiment is different from the first embodiment in that the contact surfaces 35A and 36A of both the pair of power receiving terminals 35 and 36 of the lawn mower 2 face downward, and a partition member 31S is provided between the power receiving terminals 35 and 36. Hereinafter, the description overlapping with the first embodiment will be omitted, and differences will be explained.

As shown in FIG. 9, the power receiving terminals 35 and 36 are spaced apart along the right-left direction above the plug unit 53 inserted in the recessed portion 2K. The structure and support of the power receiving terminals 35 and 36 may be the same as the structure and support of the power receiving terminal 35 of the first embodiment. However, this configuration is not necessarily the case and the power receiving terminals 35 and 36 may be separately disposed in different parts (for example, the vehicle body cover 21 and the vehicle body 11) from among the plurality of parts constituting the lawn mower 2. The power receiving terminals 35 and 36 may be shifted in the front-rear direction or the like.

The plug unit 53 is provided with a plurality (two) of raised portions 58A that are spaced apart along the right-left direction, rising upward and extending in the front-rear direction, and power transmission terminals 55 and 56 are separately provided for the respective raised portions 58A. The upper surfaces of the raised portions 58A are inclined surfaces similar to those of the first embodiment so that adhesion of moisture to the power transmission terminals 55 and 56 is prevented. Further, the periphery of the raised portions 58A is also an inclined surface as in the first embodiment so that the water around the raised portions 58A can be quickly discharged from the plug unit 53.

The partition member 31S is provided between the power receiving terminals 35 and 36, and projects downward from the contact surfaces 35A and 36A of the power receiving terminals 35 and 36. The partition member 31S functions as a draining member that actively prevents wet grass and the like from adhering to and straddling between the power receiving terminals 35 and 36, and prevents moisture from adhering to and straddling between the contact surfaces 35A and 36A. The shape of the partition member 31S may be changed as appropriate As long as such drainage is achievable. In addition, the member to which the partition member 31S is attached may be any of the vehicle body cover 21, the vehicle body 11, and the power receiving terminals 35 and 36 as long as the partition member 31S can be disposed in the aforementioned position.

Note that the partition member 31S is preferably a non-conductive member.

According to the third embodiment, the contact surfaces 35A and 36A, which come into contact with the charging station 6, of both of the pair of power receiving terminals 35 and 36 face downward, and the draining partition member 31S lies between the power receiving terminals 35 and 36; thus, the power receiving terminals 35 and 36 can be arranged in a compact manner, while wet grass or moisture is made unlikely to be attached to either of the power receiving terminals 35 and 36, and even if moisture or the like adheres to it, the moisture or the like barely remains on it. Hence, the situation where electrical continuity is established between the power receiving terminals 35 and 36 through moisture can be suppressed and the situation where electrical continuity is established between the pair of power transmission terminals 55 and 56 and proper charging is not achieved, and the bimetallic corrosion can be effectively suppressed.

Each of the above-described embodiments is merely one embodiment of the present invention, and any modification and application can be made without departing from the scope of the present invention.

For example, in each of the above-described embodiments, at least the first structure in which the pair of power receiving terminals 35 and 36 are separately disposed in different parts from among the plurality of parts constituting the lawn mower 2, or the second structure in which at least one of the pair of power receiving terminals 35 and 36 has a downward-facing contact surface that comes into contact with the charging station 6 may be used. Moreover, the shape of the plug unit 53 or the like in which the power transmission terminals 55 and 56 are disposed may be changed as appropriate, and widely known structures are also applicable to the shapes and structures of the power transmission terminals 55 and 56 and the power receiving terminals 35 and 36.

Although the case where the present invention is applied to the lawn mower 2 and the charging station 6 shown in FIG. 1 and other drawings has been described, the present invention may be applied to other known lawn mowers and charging stations. Moreover, the present invention is applicable not only to lawn mowers but to various autonomous travel work machines that can move to a charging station by autonomous travel.

REFERENCE SIGNS LIST

1 Automated lawn mowing system
2 Robot lawn mower (autonomous travel work machine)
2K Recessed portion
4 Lawn mowing area
5 Area wire
6 Charging station
11 Vehicle body
12 Front wheel
13 Rear wheel
14 Work unit
21 Vehicle body cover
22 Main cover
22K Opening
23 Top cover
31 Terminal portion
31K Space
31S Partition member
35 Positive-side power receiving terminal
36 Negative-side power receiving terminal
37 Dummy terminal
51 Connection base
52 Mounting base
53 Plug unit
55 Positive-side power transmission terminal
56 Negative-side power transmission terminal
58 Unit body
58A Raised portion

What is claimed is:

1. An autonomous travel work machine capable of traveling to a charging station by autonomous travel, the autonomous travel work machine comprising:
   a pair of power receiving terminals electrically connected to the charging station, wherein
   one of one power receiving terminal among the pair of power receiving terminals has a downward-facing contact surface that comes into contact with the charging station, the other power receiving terminal has a laterally facing contact surface that comes into contact with the charging station,
   the autonomous travel work machine comprises a recessed portion into which a part of the charging station can enter,
   the one power receiving terminal is provided in the recessed portion, and
   the one power receiving terminal is spaced apart from the other power receiving terminal along a direction in which the part of the charging station enters the recessed portion.

2. The autonomous travel work machine according to claim 1, comprising:
   a vehicle body that has a traveling function, and a vehicle body cover that covers the vehicle body, wherein
   the pair of power receiving terminals are separately disposed in the vehicle body and the vehicle body cover.

3. The autonomous travel work machine according to claim 1, wherein the power receiving terminal facing downward is provided in the recessed portion.

4. A charging station for the autonomous travel work machine according to claim 1, the charging station comprising:
   a pair of power transmission terminals electrically connected to the pair of power receiving terminals, wherein
   one of the pair of power transmission terminals has a contact surface that comes into contact with the power receiving terminal, the contact surface facing upward and being an inclined surface that is inclined with respect to the horizontal plane.

5. The charging station according to claim 4, comprising:
   a plug unit that has the pair of power transmission terminals spaced apart in the up-down direction and the horizontal direction, wherein
   the plug unit has an inclined surface in a region between the pair of power transmission terminals, the inclined surface draining water on the region out of the plug unit by utilizing at least gravity.

6. The autonomous travel work machine according to claim 1, wherein the one power receiving terminal is located at a different height from the other power receiving terminal.

7. The autonomous travel work machine according to claim 1, wherein the pair of power receiving terminals are both located inside the single recessed portion.

8. The autonomous travel work machine according to claim 2, wherein the vehicle body cover is provided with an opening that allows the part of the charging station to be inserted into an inside of the vehicle body cover and that defines the recessed portion, the power receiving terminal that is disposed in the vehicle body cover is disposed to the opening.

* * * * *